(12) United States Patent
Suzuki et al.

(10) Patent No.: US 6,665,464 B2
(45) Date of Patent: Dec. 16, 2003

(54) OPTICAL FUNCTION MODULE HAVING REMOVABLE OPTICAL FUNCTION UNIT

(75) Inventors: Makoto Suzuki, Chiba (JP); Kenji Suzuki, Chiba (JP); Takayuki Kosaka, Chiba (JP); Tomohiro Shimada, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 10/096,384

(22) Filed: Mar. 12, 2002

(65) Prior Publication Data
US 2002/0146201 A1 Oct. 10, 2002

(51) Int. Cl.[7] .............................. G02B 6/26; G02B 6/42
(52) U.S. Cl. ............................. 385/19; 385/33; 385/52; 385/73; 385/74; 385/140; 359/892
(58) Field of Search .......................... 385/19, 33, 140, 385/52, 73–75, 88, 92; 359/892

(56) References Cited

U.S. PATENT DOCUMENTS

| | | | | |
|---|---|---|---|---|
| 4,720,167 A | * | 1/1988 | Okura ........................ | 359/503 |
| 4,767,171 A | * | 8/1988 | Keil et al. ..................... | 385/35 |
| 5,388,172 A | * | 2/1995 | Anderson ..................... | 385/23 |
| 5,491,582 A | * | 2/1996 | Fujita ....................... | 359/341.1 |
| 5,812,307 A | * | 9/1998 | Naganuma ............... | 359/341.1 |
| 5,963,684 A | * | 10/1999 | Ford et al. .................... | 385/24 |
| 6,043,922 A | * | 3/2000 | Koga et al. .................. | 359/193 |
| 6,075,239 A | * | 6/2000 | Aksyuk et al. .............. | 250/229 |
| 6,108,466 A | * | 8/2000 | Aksyuk et al. ................ | 385/19 |
| 6,118,915 A | * | 9/2000 | Sato ............................ | 385/39 |
| 6,163,643 A | * | 12/2000 | Bergmann et al. .......... | 385/140 |
| 6,246,818 B1 | * | 6/2001 | Fukushima ................... | 385/47 |
| 6,343,166 B1 | * | 1/2002 | Hellman et al. .............. | 385/31 |
| 6,438,288 B1 | * | 8/2002 | Tehrani ........................ | 385/27 |
| 6,571,036 B2 | * | 5/2003 | Deng et al. ................... | 385/33 |
| 6,571,041 B2 | * | 5/2003 | Bourcier et al. .............. | 382/52 |
| 6,587,614 B2 | * | 7/2003 | Liao et al. .................... | 385/18 |
| 2003/0095778 A1 | * | 5/2003 | Chang et al. ............... | 385/140 |

FOREIGN PATENT DOCUMENTS

| | | | | |
|---|---|---|---|---|
| JP | 06067120 A | * | 3/1994 | ................. 359/107 |
| JP | 2000193852 A | * | 7/2000 | ............ G02B/6/42 |

* cited by examiner

*Primary Examiner*—Brian Healy
*Assistant Examiner*—Daniel Petkovsek
(74) *Attorney, Agent, or Firm*—Adams & Wilks (57) ABSTRACT

An optical function module comprises a collimator block having a substrate, at least two collimators disposed on the substrate in confronting relation to one another for collimating a light flux directed along a preselected path between the collimators, and support members each for supporting a respective one of the collimators on the substrate. An optical function device is removably connected by a connecting structure to the collimator block so that the optical function device is positioned along the preselected path of the light flux between the collimators.

28 Claims, 7 Drawing Sheets

FIG. 7(b)
PRIOR ART

OPTICAL FUNCTION MODULE HAVING REMOVABLE OPTICAL FUNCTION UNIT

BACKGROUND OF THE INVENTION

1. Field of the Invention

The present invention relates to an optical functional module on which is mounted an optical functional device such as an attenuator device, a shutter device, or a switching device for attenuating or interrupting an optical signal used in optical communication or the like, or for switching between paths for optical signals.

2. Description of the Related Art

In an optical network using optical fibers and used for the Internet or the like, there is a need to perform attenuation or interruption of optical signals, switching of signal paths, etc., in a repeater. Various optical functional components such as attenuators, shutter devices and switching devices having corresponding functions are therefore used.

Enlargement of a relay station becomes a problem due to the increase of a necessary number of relay devices in accordance with the recent increase in traffic of information communication such as optical communication.

Therefore, there is a demand that these optical functional parts be miniaturized into a module to thereby miniaturize the relaying equipment.

These modularized optical functional parts and compact optical function modules composed of collimator blocks provided with collimators sending/receiving optical signals as parallel light beam flux have been used in the relay station for the optical communication network or the like.

Figure 7A:
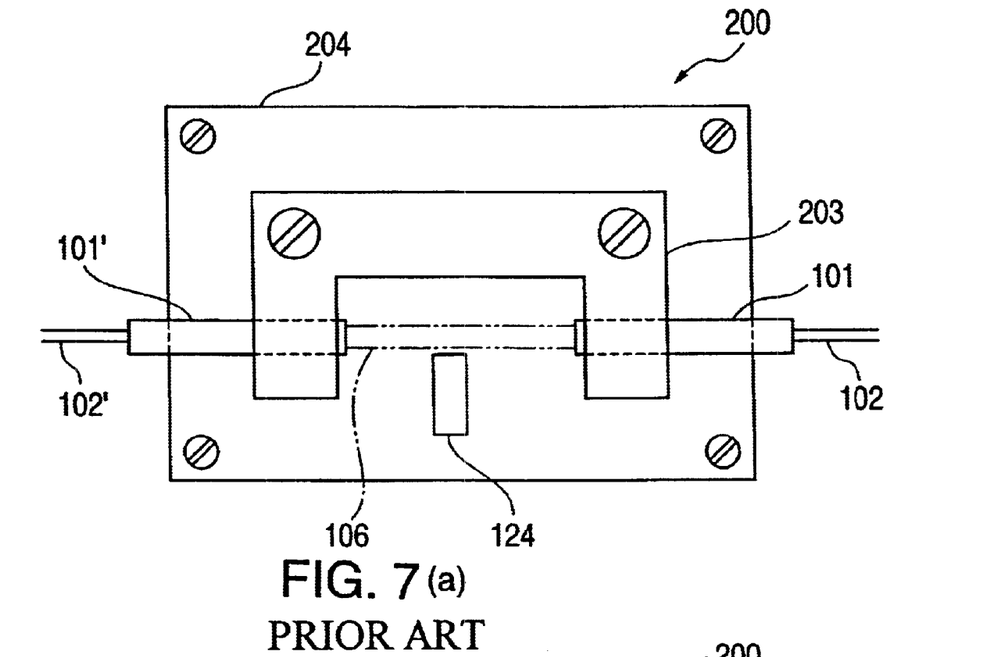
FIG. 7A is a plan view of the conventional optical function module.
Figure 7B:
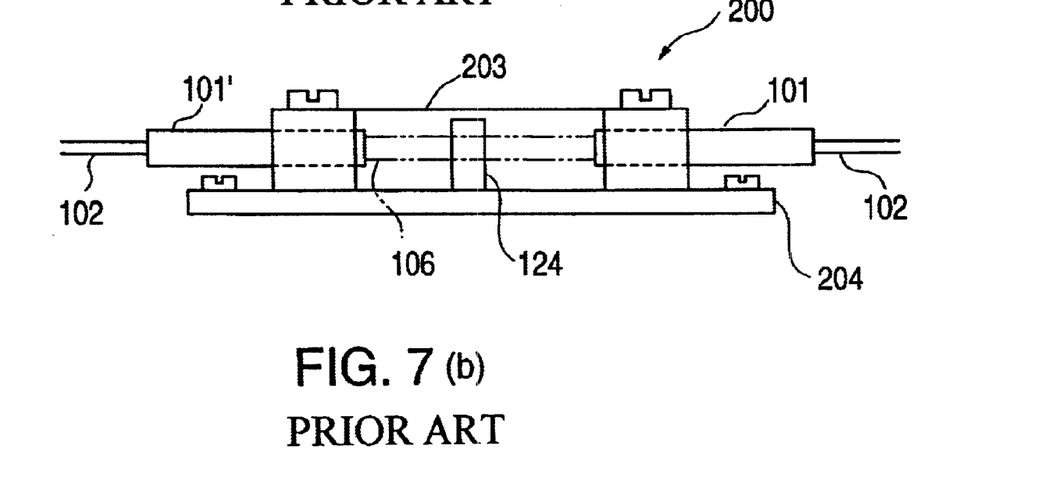
FIG. 7B is a front view of the conventional optical function module shown in FIG. 7A.

FIGS. 7A and 7B show a conventional example of an optical function module. FIG. 7A is a plan view of the conventional optical function module 200. FIG. 7B is a front view of the conventional optical function module 200 shown in FIG. 7A.

The conventional optical function module 200 is composed of collimators 101 and 101' and a collimator support member 203 holding and facing the collimators 101 and 101' disposed on a substrate 204. The collimators are connected to optical cables 102 and 102', respectively.

An optical signal passes through the optical cable 102 and is sent from the collimator 101 as a parallel optical beam flux toward the confronting collimator 101'. Thus, a light flux 106 is formed passing through a space between the confronting collimators 101 and 101'.

The optical functional part 124 is disposed directly on the substrate 204 whereby the optical functional part 124 exhibits its function to the light flux 106. Also, three or more collimators are provided on the collimator support member 203 and a switching device is used as the optical functional part 124 to thereby make it possible to perform the switching of paths of optical signals.

The important aspect of this conventional optical function module is the position of the optical functional part on the substrate.

In order to perform the attenuation, interruption and path change of the optical signals, the optical signal that has passed through the optical cable is sent as a parallel light beam flux by the collimator having an integral structure of a fiber and a lens, and the optical functional part is caused to come into contact with this parallel light beam flux to thereby perform the attenuation, interruption and path change of the optical signal.

However, a diameter of the light flux is about 500 µm, for example. In addition, the optical functional part is a very compact part. For this reason, in order to cause the optical functional part to come into exact contact with the light flux and to exhibit its function, even if there is a very slight shift with respect to the light flux in direction and position of the optical functional part, the function of the optical function module is impaired. In order to prevent this shift, whenever the optical functional part is to be mounted on the substrate, it is necessary to perform the mounting operation while measuring the exact position and direction. This causes the increase of the load on manufactures largely in terms of the cost and working efficiency.

Also, the mounting operation of the optical functional part is performed by means of fastening means such as welding, adhesives and screws.

However, for example, in the case of using the welding for mounting, it is very difficult to perform the welding operation under the condition for keeping the optical functional part at the suitable position and level for a long period of time. Also, there is a fear that the substrate would expand or shrink by the heat generated upon the welding operation so that an error would occur in position and direction of the optical functional part. Also, in order to prevent the damage of the optical functional part due to the heat, there is a limit to the area to be welded. Thus, there is a fear that a shift may occur due to the lack of the adhesive strength.

On the other hand, in case of the mounting operation with adhesives, it is possible to resolve the above-described problem of the heat generated by the welding but in order to prevent the occurrence of the error, there is a problem in that the optical functional part is required to be kept in the suitable position and direction for a long period of time until the adhesives completely dries.

Furthermore, in the conventional case, as described above, the optical functional part is mounted directly on the substrate. If any problem supposedly occurs irrespective of the error in the position and direction of the optical functional part and the fault of the function thereof, in the case where the mounting operation is performed by welding or with the adhesives, it is difficult to readjust the position and direction of the optical functional part and exchange of the optical functional parts.

Also, in case of the mounting operation by screws, it is possible to change the optical functional parts. In case of the readjustment, although it is possible to provide a new screw hole in a place far from the existing screw hole, in the readjustment of the very short distance and direction, it is impossible to provide any new screw hole due to the hindrance of the existing screwhole. It is therefore difficult to perform the readjustment.

In view of the above, it is very difficult to reuse each part such as an optical functional part and a substrate in the conventional optical function module. There is a problem in terms of a cost or a maintaining property.

SUMMARY OF THE INVENTION

In view of such circumstances, an object of the present invention is to provide an optical function module in which an optical functional part may be rapidly and easily disposed in a position where the function thereof exhibits exactly and the parts are readily replaced and may be reused.

Aspects of the present invention will be described here in after.

A first aspect of the present invention relates to an optical function module, characterized by comprising: a collimator block including a substrate, at least two or more facing collimators disposed on the substrate, and at least two collimator support members for supporting the collimators; and an optical functional part unit including an optical functional part to be disposed on the collimator block and an arrangement means for arranging the optical functional part on the collimator block.

According to a second aspect of the present invention, in the first aspect of the invention, an optical function module is characterized in that the arrangement means comprises a recess portion provided in the substrate and a holder base engaged exactly with the recess portion for arranging the optical functional part in a position where the optical functional part exactly works on a light flux between the collimators.

According to a third aspect of the present invention, in the first or second aspect of the invention, an optical function module is characterized in that the arrangement means comprises at least one guide pin provided on the substrate and a guide pin insertion hole corresponding to the guide pin, and a holder base for engaging the guide pin and the guide pin insertion hole with each other to dispose the optical functional part to a position where the optical functional part exactly works on a light flux between the collimators.

According to a fourth aspect of the present invention, in any one of the first to third aspects of the invention, an optical function module is characterized in that the optical functional part is an optical filter device for obtaining a transmission light having a predetermined wavelength from a light flux between the collimators.

According to a fifth aspect of the present invention, in any one of the first to third aspects of the invention, an optical function module is characterized in that the optical functional part is a shutter device for interrupting a light flux between the collimators.

According to a sixth aspect of the present invention, in any one of the first to third aspects of the invention, an optical function module is characterized in that an optical functional part is an attenuating device for attenuating a light flux between the collimators.

According to a seventh aspect of the present invention, in any one of the first to sixth aspects of the invention, an optical function module is characterized in that the optical functional part is provided with a piezoelectric actuator using as a power source a vibration generated in a piezoelectric vibrating member as a driving source.

According to an eighth aspect of the present invention, in any one of the first to seventh aspects of the invention, an optical function module is characterized in that the substrate, the collimator support member, the holder base and the arrangement means are made of stainless steel.

According to a ninth aspect of the present invention, in any one of the first to eighth aspects of the invention, an optical function module is characterized in that the substrate, the collimator support member, the holder base and the arrangement means are made of super engineering plastics.

DETAILED DESCRIPTION OF THE PREFERRED EMBODIMENTS

An optical function module according to the present invention will now be described with reference to the accompanying drawings.

The following embodiments are described only for the purpose of describing the present invention and are not used to limit the scope of the invention. Accordingly, it is possible for those skilled in the art to adopt various embodiments or forms including part or all of these elements. These modifications and alternative forms should be included in the scope of the invention.

First Embodiment

Figure 1:
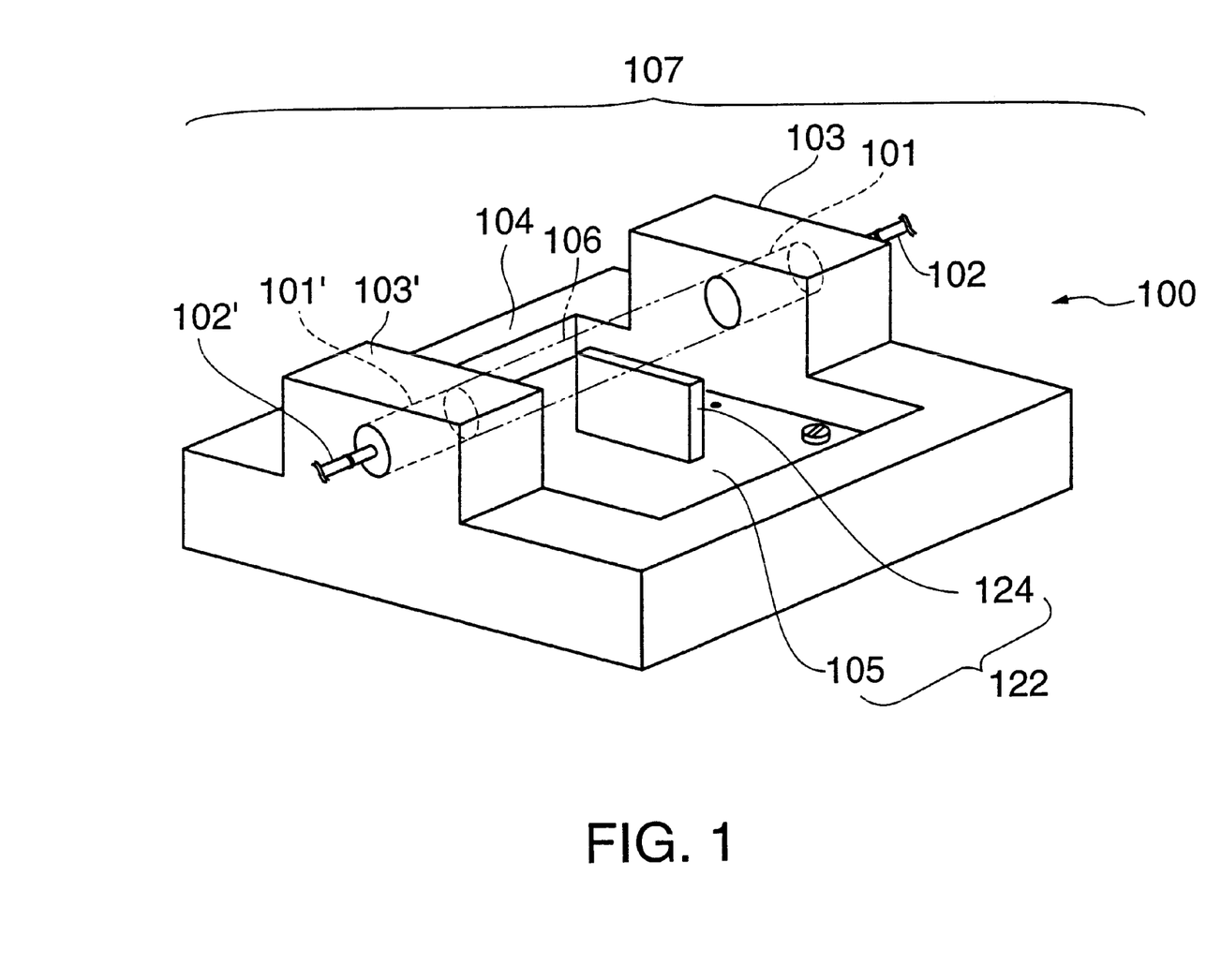
FIG. 1 is a view showing a primary structure of an optical function module in accordance with a first embodiment of the present invention.

FIG. 1 is a view showing a primary structure of an optical function module in accordance with a first embodiment of the present invention.

The optical function module 100 according to the first embodiment of the present invention is composed of a collimator block 107 and an optical functional unit 122 (hereinafter "optical functional part unit") to be mounted on the collimator block 107.

The collimator block 107 is composed of a substrate 104, collimators 101 and 101' disposed on the substrate 104 and collimator support members 103 and 103' facing and holding the collimators 101 and 101' and is connected to optical cables 102 and 102'.

The optical function part unit 122 is provided with an optical function device or optical functional part 124 and mounting means 105 (hereinafter "arrangement" means) for mounting the optical functional part 124 to the collimator block 107.

An optical signal passes through the optical cable 102 and fed from the collimator 101 as a parallel light beam flux toward the confronting collimator 101'. Thus, a light flux 106 passing through a space between the confronting collimators 101 and 101' is formed. The optical functional part 124 works on this light flux 106.

The optical functional part 124 includes, for example, an optical filter device for obtaining a transmission light having a predetermined wavelength from the optical signal, an attenuating device for attenuating the optical signal, a shutter device for shutting the optical signal and the like.

Also, it is possible to provide three or more collimators on the substrate 104 and to arrange two or more collimators at positions facing the single collimator to use a switching device utilizing the optical refraction as the optical functional part to thereby switch the paths of the optical signal. In addition, it is also possible to arrange a plurality of collimators at positions facing a plurality of collimators like the arrangement of the three collimators at positions facing the two collimators.

In the same manner as in the above-mentioned conventional optical function module, the optical functional part 124 should be arranged at the position where it works exactly on the light flux 106. The means for easily and rapidly performing this is the arrangement means 105.

This arrangement means 105 is composed of a recess portion provided on the substrate 104, guide pins, a base member or holder base for engaging the recess portion and having guide pin insertion holes for receiving the guide pins.

Figure 2:
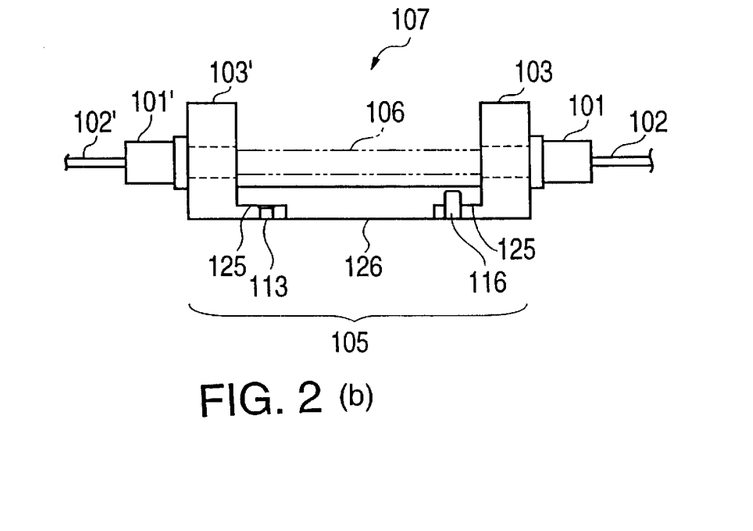
FIG. 2A is a plan view of the collimator block in accordance with the first embodiment of the present invention.
FIG. 2B is a sectional front view of the collimator block taken along the line E–E' of FIG. 2A.
FIG. 2C is a side elevational view of the collimator block shown in FIG. 2A.
Figure 3:
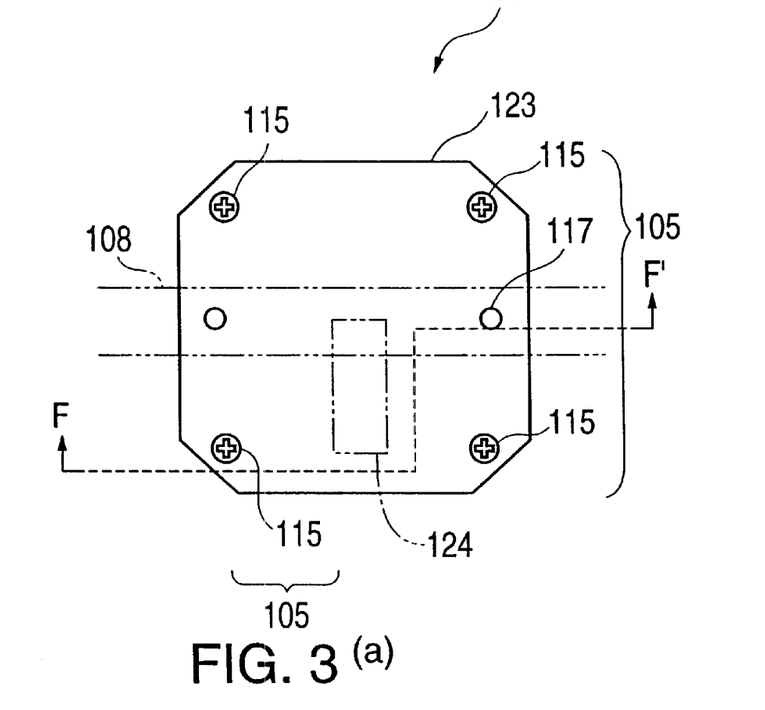
FIG. 3A is a plan view of a holder base in accordance with the first embodiment of the present invention.
FIG. 3B is a cross-sectional view of the holder base taken along the line F–F' of FIG. 3A.

The recess portion provided on the substrate 104 and the guide pins will be described in detail with reference to FIGS. 2A to 2C. The holder base 123 engaging with the recess portion and the guide pin insertion holes will be described in detail with reference to FIGS. 3A and 3B.

FIG. 2A is a plan view of the collimator block 107 in accordance with the first embodiment of the present invention. FIG. 2B is a sectional front view of the collimator block 107 taken along the line E–E' of FIG. 2A. FIG. 2C is a side elevational view of the collimator block 107 shown in FIG. 2A.

The collimator block 107 in accordance with the first embodiment of the present invention is provided with the arrangement means 105 and a cover mounting screw holes 118 in addition to the substrate 104, the collimators 101 and 101', the collimator support members 103 and 103' for supporting the collimator 101 and 101' and the optical cable 102 and 102'.

The arrangement means 105 provided on the substrate 104 is provided with a square recess portion 125, guide pins 116 to be provided on this square recess portion 125 and fastening screw holes 113 passing up and down through the substrate.

Furthermore, a square hole 126 passing through the recess portion 125 is provided in the recess portion 125.

In order to cause the light flux 106 to pass between the collimators 101 and 101' normally, the collimator support members 103 and 103' for supporting the collimators 101 and 101', respectively, are subjected to the exact positional adjustment so that their positions and directions are completely identical with each other.

The recess portion 125 is exactly machined so that sides A and C are parallel with the optical axis of the light flux 106. Also, sides B and D are exactly machined so as to be perpendicular to the optical axis of the light flux 106. Also, upon this machining operation, the distance between the side A and the light flux 106 and the distance between the side C and the light flux 106 are measured.

Furthermore, the distance between the side B and the side D, i.e., the length of the light flux is measured. The recess portion 125 thus machined functions as a positional standard for the optical functional part 124 (FIG. 1).

The two guide pins 116 are provided in the positions where the line connecting the two guide pins to each other is identified with the optical axis of the light flux 106 without any error so that these pins also function as the positional standard for the optical functional part 124.

Note that, in this embodiment, there is shown the case where the two guide pins 116 are provided. However, the invention is not limited to this case. For example, four guide pins may be arranged so as to form the two standard lines in parallel with the optical axis of the light flux 106 to thereby define the positional standard for the optical functional part 124.

FIG. 3A is a plan view of the holder base 123 in accordance with the first embodiment of the present invention. FIG. 3B is a cross-sectional view of the holder base 123 taken along the line F–F' of FIG. 3A.

The holder base 123 in accordance with the first embodiment of the present invention is engaged with the recess portion 125 (FIGS. 2A and 2B) on the substrate 104 as the fastening means. Also, the holder base 123 is provided with the guide pin insertion holes 117 passing up and down through the holder base 123 exactly corresponding to the guide pins 116 of FIGS. 2A to 2C.

Furthermore, the holder base 123 is provided with fastening screw holes 114 passing up and down through the holder base 123 corresponding to the fastening screw holes 113 in the recess portion 125 shown in FIGS. 2A and 2B and fastening screws 115 corresponding to the fastening screw holes 113 and 114.

The holder base 123 is formed into a square shape and perfectly identified with the recess portion 125 shown in FIGS. 2A and 2B in shape and dimension. Accordingly, the holder base 123 also functions as the positional standard for the optical functional part 124 provided on the above-described recess portion 125.

Note that, in order to easily perform the engagement of the holder base 123 with the recess portion 125 and the removal of the base from the recess portion 125, the corner portions of the holder base 123 are beveled to such an extent that the perfect identification of the holder base 123 with the recess portion 125 in the dimension and the shape may be kept.

Also, since the guide pin insertion holes 117 exactly correspond to the guide pins of FIGS. 2A to 2C as described above, the holder base 123 provided with these pins function as the positional standard for the optical functional part 124 provided by the above-described guide pins 116.

It is possible to obtain the design path 108 for the light flux 106 from the above-described standard. After that, the holder base 123 is engaged with the recess portion 125 (FIGS. 2A and 2B). When the optical function module 100 is actually used, the light flux 106 passes through the design path 108.

The optical functional part insertion hole 109 is provided in the position defined by using the design path 108 on the holder base 123 as the standard. The optical functional part 124 is inserted into this optical functional part insertion hole 109 to be arranged in place.

The arranged optical functional part 124 is fastened by means of a fastening screw hole 111 passing through the holder base 123 upwardly and reaching the bottom portion of the optical functional part 124 and a corresponding fastening screw 112.

The holder base 123 to which the optical functional part 124 is fixed is engaged with the recess portion 125 so that the optical functional part 124 may easily and rapidly be arranged, without any adjustment work, to the position where it serves normally with respect to the light flux 106.

The above-described arrangement means 105 is used to enhance the exchangeability of the parts. In the case where a plurality of different kinds of optical functional parts 124 are used differently on the single collimator block 107 as necessary, and in the case where the broken optical functional part 124 is to be exchanged by a new one, the optical functional part unit 122 where the optical functional parts 124 are arranged respectively is exchanged as a unit whereby it is possible to perform the exchange of the optical functional parts 124 easily and rapidly without any adjustment work in position and direction.

Figure 4:
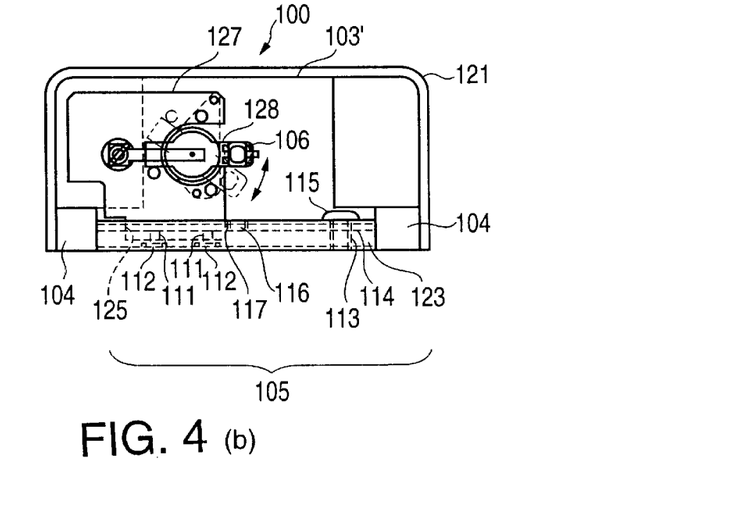
FIG. 4A is a plan view of the optical function module provided with an optical filter device in accordance with the first embodiment of the present invention.
FIG. 4B is a sectional front view of the optical function module taken along the line G–G' of FIG. 4A.
FIG. 4C is a sectional side elevational view of the optical function module taken along the line H–H' of FIG. 4A.

FIG. 4A is a plan view of the optical function module 100 provided with an optical filter device in accordance with the first embodiment of the present invention. FIG. 4B is a sectional front view of the optical function module 100 taken along the line G–G' of FIG. 4A. FIG. 4C is a sectional side elevational view of the optical function module 100 taken along the line H–H' of FIG. 4A.

FIGS. 4A to 4C show the optical function module 100 provided with an optical filter device 127 as the optical functional part 124 in accordance with the first embodiment of the present invention.

The optical function module 100 is further provided with a cover 121, for covering the overall optical function module, to be mounted by means of cover mounting screws 119 corresponding to cover mounting screw holes 118 to be provided in the collimator support members 103 and 103'.

The optical filter device 127 is a device for obtaining the transmission light having a predetermined wavelength from the light flux 106 by means of a transmission light filter member 128.

As shown in FIG. 4B, the transmission light filter member 128 is rotated about its own rotary axis and brought into contact with the light flux 106 to thereby obtain the transmission light having a predetermined wavelength.

The optical filter device 127 is exactly arranged by means of the arrangement means 105 in the position where it normally works on the light flux 106, i.e., the position where the transmission light filter member 128 is brought into suitable contact with the light flux 106.

Also, in the case where the transmission light wavelength is not necessary, the transmission light filter member 128 is rotated to the position where it is out of contact with the light flux 106.

In order not to generate rust for a long period of time, stainless steel, for example, SUS304, 312, 316 or the like is preferably used for the collimator support members 103 and 103', the substrate 104, the arrangement means 105, the cover mounting screws 119, the cover 121 and the holder base 123.

In order to prevent the expansion due to the heat, it is possible to use super engineering plastics for the collimator support members 103 and 103', the substrate 104, the arrangement means 105, the cover mounting screws 119, the cover 121 and the holder base 123.

The super engineering plastics have a much lower thermal expansion coefficient than that of conventional engineering plastics and are less expanded due to the heat. The thermal expansion coefficient of PEEK (polyether etherketone) that is one of the typical super engineering plastics is $2.3 \times 10^{-5}/K$ at 200C. and is smaller than $2.7 \times 10^{-5}/K$ of PC (polycarbonate) which is one of the conventional engineering plastics.

Second Embodiment

Figure 5:
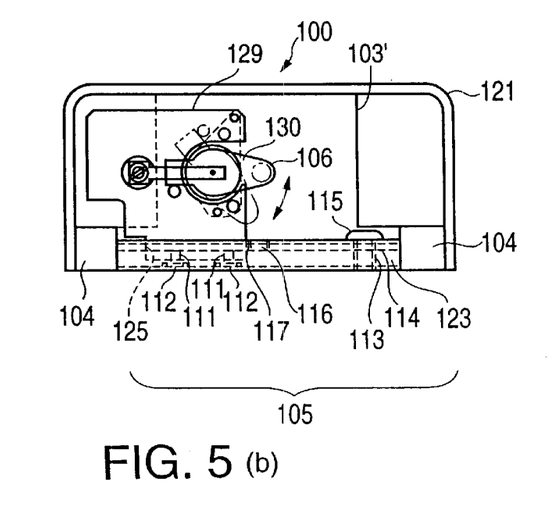
FIG. 5A is a plan view of the optical function module in accordance with a second embodiment of the present invention.
FIG. 5B is a sectional front view of the optical function module taken along the line I–I' of FIG. 5A.
FIG. 5C is a sectional side elevational view of the optical function module taken along the line J–J' of FIG. 5A.

FIG. 5A is a plan view of the optical function module 100 in accordance with a second embodiment of the present invention.

FIG. 5B is a sectional front view of the optical function module 100 taken along the line I–I' of FIG. 5A.

FIG. 5C is a sectional side elevational view of the optical function module 100 taken along the line J–J' of FIG. 5A.

FIGS. 5A to 5C show the optical function module 100 provided with a shutter device 129 as the optical functional part 124 in accordance with the second embodiment of the present invention.

The shutter device 129 is a device for shielding the light flux 106 by means of a shutter member 130.

As shown in FIG. 5B, the shutter member 130 is rotated about its own rotary axis to interrupt the light flux 106.

The shutter device 129 is exactly disposed by the arrangement means 105 in the position where it works normally on the light flux 106, i.e., the shutter member 130 suitably interrupts the light flux 106.

Also, in the case where the light flux is not to be interrupted, the shutter member 130 is rotated to the position where it no longer contacts the light flux 106.

The other factors such as shape, function, effect and the like of the member are the same as those of the optical function module of the first embodiment of the present invention.

Third Embodiment

Figure 6:
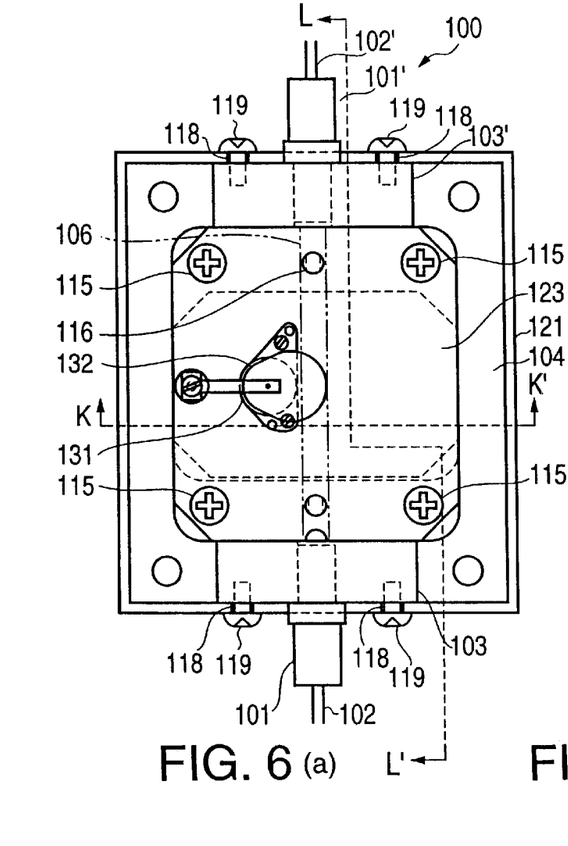
FIG. 6A is a plan view of the optical function module in accordance with a third embodiment of the present invention.
FIG. 6B is a sectional front view of the optical function module taken along the line K–K' of FIG. 6A.
FIG. 6C is a sectional side elevational view of the optical function module taken along the line L–L' of FIG. 6A.

FIG. 6A is a plan view of the optical function module 100 in accordance with a third embodiment of the present invention.

FIG. 6B is a sectional front view of the optical function module 100 taken along the line K–K' of FIG. 6A.

FIG. 6C is a sectional side elevational view of the optical function module 100 taken along the line L–L' of FIG. 6A.

FIGS. 6A to 6C show the optical function module 100 provided with an attenuating device 131 as the optical functional part 124 in accordance with the third embodiment of the present invention.

The attenuating device 131 is a device for attenuating the light flux 106 by means of a variable attenuating member 132.

As shown in FIG. 6B, the variable attenuating device 132 is rotated about its own rotary axis and is brought into contact with the light flux 106 to thereby attenuate the light flux and changes the contact area to thereby change the attenuation amount.

The attenuating device 131 is exactly disposed by the arrangement means 105 in the position where it normally works on the light flux 106, i.e., the variable attenuating member 132 is brought into suitable contact with the light flux 106.

Also, in the case where the attenuation is unnecessary, the variable attenuating member 132 is rotated to the position out of contact with the light flux 106.

The other factors such as shape, function, effect and the like of the member are the same as those of the optical function modules of the first and second embodiments of the present invention.

Also, the optical function module 100 in accordance with the first to third embodiments shown in FIGS. 1A to 5C is provided as the arrangement means 105 with both the guide pins 116 and the guide pin insertion holes 117, and the holder base 123 and the recess portion 125. However, the invention is not limited thereto. It is possible to only use one of the unit of the guide pins 116 and the guide pin insertion holes and the unit of the holder base 123 and the recess-portion 125.

Also, the optical functional parts 124 including the optical filter device 127, the shutter device 129 and the attenuating device 131 in accordance with the first, second and third embodiments of the present invention shown in FIGS. 1A to 5C may use a piezoelectric actuator using as a power source the vibration generated in a piezoelectric vibrating member as a driving source. Thus, it is possible to further miniaturize the optical function module 100.

Moreover, an ultrasonic wave motor using as a driving source the mechanical vibration in the ultrasonic wave band may be included in this piezoelectric actuator.

Moreover, an encoder (not shown) for measuring an angular velocity is provided to thereby make it possible to perform the further fine operation.

As described above, according to the present invention, it is possible to exactly dispose to a predetermined position of the collimator block an optical functional part unit provided with an optical functional part and an arrangement means capable of exactly positioning this optical functional part which is disposed exactly to a predetermined position to the substrate. Thus, it is possible to provide an optical function module in which an optical functional part may easily and rapidly be displaced in a position where the optical functional part work exactly and parts can be exchanged and reused.

What is claimed is:

1. An optical function module comprising:
    a collimator block having a substrate, at least two collimators disposed on the substrate in confronting relation to one another for collimating a light flux directed along a preselected path between the collimators, and a plurality of support members each for supporting a respective one of the collimators on the substrate; an optical function device positionable along the preselected path of the light flux between the collimators of the collimator block; and
    connecting means for removably connecting the optical function device to the collimator block.

2. An optical function module according to claim 1; wherein the connecting means comprises a base member for supporting the optical function device, and a recess formed in the substrate for receiving the base member so that the optical function device is positioned in the preselected path of the light flux.

3. An optical function module according to claim 1; wherein the connecting means comprises at least one guide pin disposed on the substrate, and a base member for supporting the optical function device and having a hole for receiving the guide pin so that the optical function device is positioned in the preselected path of the light flux.

4. An optical function module according to claim 1; wherein the optical function device comprises an optical filter for filtering a transmission light having a predetermined wavelength from the light flux between the collimators.

5. An optical function module according to claim 1; wherein the optical function device comprises a shutter for interrupting the light flux between the collimators.

6. An optical function module according to claim 1; wherein the optical function device comprises an attenuating device for attenuating the light flux between the collimators.

7. An optical function module according to claim 1; wherein the optical function device comprises a piezoelectric actuator driven by a vibration generated by a piezoelectric vibrating member.

8. An optical function module according to claim 1; wherein the substrate and the support members of the collimator block are made of stainless steel.

9. An optical function module according to claim 1; wherein the substrate and the support members of the collimator block are made of a high-strength plastic material.

10. An optical function module according to claim 2; wherein the substrate, the support members, and the base member are made of stainless steel.

11. An optical function module according to claim 2; wherein the substrate, the support members, and the base member are made of a high-strength plastic material.

12. An optical function module comprising:
    a substrate having a main surface and a recess formed in the main surface;
    at least two collimators mounted on the main surface of the substrate in confronting relation to one another for collimating a light flux directed along a preselected path between the collimators; and
    an optical function unit having a base member removably connected in recess of the substrate and an optical function device removably supported by the base member so that the optical functional device is disposed in the preselected path of the light flux between the collimators.

13. An optical function module according to claim 12; further comprising a plurality of support members each for supporting a respective one of the collimators on the main surface of the substrate.

14. An optical function module according to claim 13; wherein the support members and the substrate are formed from a single piece of material.

15. An optical function module according to claim 14; wherein the single piece of material comprises stainless steel.

16. An optical function module according to claim 14; wherein the single piece of material comprises a high-strength plastic material.

17. An optical function module according to claim 12; further comprising at least one guide pin disposed in the recess of the substrate; and wherein the base member has a hole for receiving the guide pin when the optical functional device is positioned in the preselected path of the light flux.

18. An optical function module according to claim 12; wherein the optical function device comprises an optical filter for filtering a transmission light having a predetermined wavelength from the light flux between the collimators.

19. An optical function module according to claim 12; wherein the optical function device comprises a shutter for interrupting the light flux between the collimators.

20. An optical function module according to claim 12; wherein the optical function device comprises an attenuating device for attenuating the light flux between the collimators.

21. An optical function module according to claim 12; wherein the optical function device comprises a piezoelectric actuator driven by a vibration generated by a piezoelectric vibrating member.

22. An optical function module according to claim 12; wherein the substrate and the base member of the optical function unit are made of stainless steel.

23. An optical function module according to claim 12; wherein the substrate and the base member of the optical function unit are made of a high-strength plastic material.

24. An optical function module according to claim 12; wherein the base member comprises a plate having a plurality of holes for receiving removable connecting members to removably connect the base member in the recess of the substrate.

25. An optical function module comprising: an optical function unit having a base member and an optical function device removably connected to the base member; and a collimator block having a substrate, at least one pair of collimators mounted on the substrate in confronting relation to one another, and a recess formed in a main surface of the substrate for receiving the base member of the optical function unit so that the optical function device is disposed between the collimators.

26. An optical function module according to claim 25; further comprising support means for supporting the collimators on the main surface of the substrate.

27. An optical function module according to claim 26; wherein the support means comprises a pair of spaced-apart support members extending from the main surface of the substrate with the recess disposed therebetween.

28. An optical function module according to claim 25; further comprising at least one guide pin disposed in the recess of the substrate; and wherein the base member has a hole for receiving the guide pin when the base member is disposed in the recess.

* * * * *

UNITED STATES PATENT AND TRADEMARK OFFICE
CERTIFICATE OF CORRECTION

PATENT NO. : 6,665,464 B2
DATED : December 16, 2003
INVENTOR(S) : Makoto Suzuki et al.

It is certified that error appears in the above-identified patent and that said Letters Patent is hereby corrected as shown below:

Title page,
Insert item:
-- [30]  Foreign Application Priority Data
March 28, 2001  [JP] JAPAN ... 2001-093835 --.

Signed and Sealed this

Eighteenth Day of May, 2004

JON W. DUDAS
*Acting Director of the United States Patent and Trademark Office*